US006816989B2

(12) United States Patent
Litt

(10) Patent No.: US 6,816,989 B2
(45) Date of Patent: Nov. 9, 2004

(54) METHOD AND APPARATUS FOR EFFICIENTLY MANAGING BANDWIDTH OF A DEBUG DATA OUTPUT PORT OR BUFFER

(75) Inventor: Timothe Litt, Southborough, MA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 522 days.

(21) Appl. No.: 10/033,230

(22) Filed: Dec. 28, 2001

(65) Prior Publication Data

US 2003/0126314 A1 Jul. 3, 2003

(51) Int. Cl.[7] ............................................. G01R 31/28
(52) U.S. Cl. ..................................... 714/724; 714/45
(58) Field of Search ................................ 714/724, 725, 714/732, 733, 734, 736, 45

(56) References Cited

U.S. PATENT DOCUMENTS

| | | | | |
|---|---|---|---|---|
| 3,939,333 A | * | 2/1976 | Keech | 714/724 |
| 5,530,706 A | * | 6/1996 | Josephson et al. | 714/727 |
| 5,724,505 A | * | 3/1998 | Argade et al. | 714/45 |
| 5,831,994 A | * | 11/1998 | Takino | 714/736 |
| 6,282,674 B1 | * | 8/2001 | Patel et al. | 714/30 |
| 6,311,303 B1 | * | 10/2001 | Gates et al. | 714/734 |
| 6,615,370 B1 | * | 9/2003 | Edwards et al. | 714/45 |

* cited by examiner

Primary Examiner—Guy J. Lamarre
Assistant Examiner—John P Trimmings

(57) ABSTRACT

An output port for an integrated circuit includes a bandwidth manager for assisting in the off-loading of internal state data during debug periods. The bandwidth manager operates to take internal state data at its normal frequency, and outputs at least the most important portions of that data to external logic. During periods when the output port is able to keep up with the internal sources being sampled, the bandwidth manager will cause all of the state data to be transmitted. If the output port becomes saturated, the bandwidth manager will select the most important portions of the internal state data to be transmitted off-chip, and will drop the less important information. The bandwidth manager is configured to operate dynamically based on the ability of the output port to keep up with the data being generated by the internal sources. The bandwidth manager determines the importance of data based on principles underlying the structure of packets, rather than on detailed parsing of packets, and without relying on knowledge of packet semantics.

66 Claims, 3 Drawing Sheets

METHOD AND APPARATUS FOR EFFICIENTLY MANAGING BANDWIDTH OF A DEBUG DATA OUTPUT PORT OR BUFFER

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

1. Field of the Invention

The present invention relates generally to the debugging of digital logic devices. More specifically, the present invention relates to the retrieval of state data and program counter data from a digital logic device. Still, more particularly, the invention relates to a digital logic device that includes a port for off-loading test data generated at or near the normal clock speed of the digital logic device to an external device operating at a slower speed.

2. Background of the Invention

The design and development of digital logic circuits has become increasingly complex, due in large measure to the ever-increasing functionality offered in such circuits. Integrated circuits are constantly surpassing milestones in performance, as more and more functionality is packaged into smaller sizes. This enhanced functionality requires that a greater number of transistors be included in an integrated circuit, which in turn requires more rigorous testing to insure reliability once the device is released. Thus, integrated circuit designs are repeatedly tested and debugged during the development phase to minimize the number and severity of errors that may subsequently arise. In addition, chips may be tested to determine the performance characteristics of the device, including the speed or throughput of the chip, software running on the chip, or the aggregate performance of the system.

As integrated circuits become more complex, the length of the debug phase increases, requiring a greater advanced lead-time before product release. In addition, as the complexity of integrated circuits increase, it becomes necessary to fabricate more prototype iterations of the silicon (or "spins" of silicon) in order to remove successive layers of bugs from the design, thereby increasing the engineering and materials cost of the released product. It would be desirable to reduce these engineering and material costs and speed up the product cycle. Moreover, if more data, or more accurate data was available for analysis, the designers and debuggers might be able to expedite the design and debug process for the product, thereby minimizing the number of spins and the time to release the product.

One of the chief difficulties encountered during the debug phase of a product is identifying the source of an error. This can be extremely difficult because the error may make it impossible to obtain state information from the integrated circuit. For example, in a processor, an error may cause the processor to quit executing, thus making it impossible to obtain the state data necessary to identify the source of the error. As a result, the debug process requires that the debug team infer the source of the error by looking at memory accesses by the processor or patterns of activity on other external busses. The normal technique for probing external busses is to solder a wire onto a terminal or trace. Unfortunately, merely adding a soldered wire to a terminal or trace can create signal reflections, which may distort the data being monitored. Thus, the manual probing of bus terminals and traces is impractical and inaccurate, especially those attached to high speed, highly complex chips. More sophisticated techniques are also used, but are expensive and suffer, albeit to a lesser degree, from the same effects. Further, because the state information available on these busses is typically a small subset of the processor's state, the debug team must make guesses regarding the state of data internal to the processor. If the internal state of the processor could be acquired and stored, these inferences would be replaced by solid data. By reducing the designer's uncertainty and increasing the available data, this would be beneficial in solving problems with the processor hardware or software.

In certain products under development, such as new microprocessors under development by the assignee of the present invention, the number of transistors is exceedingly large and their dimensions are exceedingly small. Both of these factors make it practically impossible to probe internal terminals of the chip or internal wire traces. Moreover, to the extent that certain internal terminals and traces could be probed, the conventional methods for conducting such a probing operation are extremely expensive, and some might potentially corrupt the state of the terminals and traces being probed. Consequently, the only common technique currently available to test or probe the state of terminals and traces in highly complex chips is to route signals through the chip's external output terminals, to some external interface. This approach, as presently implemented, suffers in certain respects.

Oftentimes the internal clock rate of the chip operates at a much higher rate than the external logic analyzers that receive and process the data. As an example, processor designs currently under development operate at clock speeds up to and exceeding 2.0 GHz. The fastest commercial logic analyzers, despite their expense, are incapable of operating at GHz frequencies. Thus, either certain data must be ignored, or some other mechanism must be employed to capture the high-speed data being generated on the chip. The typical approach is to run the chip at a slower clock speed so the data can be captured by external test equipment. This solution, however, makes it more difficult to detect the bugs and errors that occur when the chip is running at full clock speeds. Some errors that occur at full clock speed will not be detected when the clock speed is reduced to accommodate the off-chip logic analyzers. Also, increasingly the processor connects to external components that have a minimum speed, below which they will not operate. These speeds require the processor to operate faster than the external logic analyzer can accommodate.

The assignee of the present invention has developed a specially dedicated port with pads for accessing test data from several on-chip data sources. This port permits a large quantity of internal state data to be sent off the chip at a relatively high bandwidth. Despite the advances offered by this dedicated port, the amount of transmission bandwidth available from this port still reflects but a fraction of the bandwidth required to sample all of the data being generated internally in the chip. Thus, even with the increased bandwidth offered by the dedicated test port, there is a mismatch between the chip's ability to create data and the port's ability to off-load the data. Given this mismatch, it is impossible to get all of the internal state data off the chip.

One way to handle the mismatch between the amount of state data being created and the output data rate has been through selection of the data to be output. The prior art systems that have attempted to address this problem have been configured to operate in a worst case scenario, so that if the output port is saturated, some fraction of the data, or the most desirable data, will be selected and sent off chip. Thus, as example, the operator may configure the device to output every $n^{th}$ packet of data, and discard all others. Alternatively, the device may be configured to ignore all non-operational packets, and send only operational packets off chip. The problem with these approaches is there are periods when the output port is not saturated, and therefore other internal state data could be sent off-chip during these periods. Unfortunately, no one has developed a system that permits internal state data to be off-loaded in dynamic fashion, so that the most important data is off-loaded during periods when the port is saturated, and all state data is off-loaded if the port is not saturated.

It would be desirable if a system or technique was developed that would permit the downloading of data from a device under test to external logic analyzers, while operating the device at normal or close to normal clock speeds. It also would be advantageous if a mechanism was developed which would dynamically optimize the data that is downloaded based on how busy the port was. Despite the apparent advantages that such a system would offer, to date no such system has been developed.

BRIEF SUMMARY OF THE INVENTION

The problems noted above are solved in large part by a bandwidth manager that is capable of receiving incoming state data, and outputting the most important portions of that data. The bandwidth manager receives state data from one or more sources within the chip. The data from the sources is delivered to the output port in packets, each of which is comprised of one or more ticks. In these packets, as is conventional in most communication protocols, the most critical information for debug is located in the early ticks in the packet. Examples of critical information include packet type, addressing, flow control, and resource identifiers. The remaining information in longer packets is data, also referred to as payload. In many debugging exercises, the payload represents less important information than the header information.

The source of the incoming data is selected in a front end multiplexer. The front end multiplexer may include packet prediction logic which decodes the packet type opcode in the first tick of the packet, and which predicts whether a particular tick is the start of a packet or not. In addition, the packet prediction logic predicts the number of ticks in a packet. The packet prediction logic adds one or more bits to each tick of the packet, which indicate the relative importance of that tick. Another bit may be added to each tick to indicate if the tick is full of valid data. On each clock cycle, the front-end multiplexer presents a tick of data to a smart buffer. The smart buffer decides whether to accept the data tick from the front end multiplexer based on the importance bit(s) and the full bit. If the newly presented tick has a higher importance level than the tick stored at the rear of the smart buffer, then the newly presented data tick overwrites the less important tick previously stored. This tail-eating mechanisms repeats on each clock cycle as the most important data is saved instead of less important data. If the smart buffer does not accept a packet tick because its importance is less than the last stored tick, then the newly presented tick is dropped. Every other subsequent tick in the packet will also be dropped automatically. Data in the smart buffer forms is queued for transmission off the chip, and the output data rate.

According to one aspect of the invention, the smart buffer may be organized in a modified FIFO arrangement. Each storage location in the smart buffer knows whether it is empty or full and the relative importance of the tick that it contains. In addition, each storage location receives signals that indicate what the corresponding information is for adjacent storage locations, and also knows if the current cycle is an output cycle for the output port. When data is presented, each element decides what to do. If the current cycle is an output cycle of the port, data can be accepted because the next storage location can also accept data. Also, if the adjacent element is empty, then incoming data can be accepted. Similarly, if any downstream location is empty, then data can be accepted. If none of the downstream storage locations are empty, then the new incoming data can only be accepted if it is more important than the data stored in the last storage location. Of course, the scheduling function could be handled centrally, but the organization described is preferred because it will naturally produce regular data and control structures.

According to one aspect of the present invention, data may be handled in the bandwidth manager in multiple parallel streams. Thus, the front end multiplexer selects multiple data sources n, for presenting to multiple smart buffers n. Each of the smart buffers is configured in identical fashion. In the case where multiple streams are used, a back end multiplexer selects which of the streams to select for connection to output drivers to be driven off the chip. The back end multiplexer includes arbitration logic that determines which of the data streams is selected for each available output time-slot. According to the preferred embodiment, if only one stream has valid data, it is selected. If one stream has already truncated transmission of its current packet, another stream is selected until the start of a new packet is encountered. If one stream has not truncated, AND the other streams of equal or higher importance have at least one free entry in the smart buffer the first stream is selected (This rule prevents fragmentation when, for example, two streams of equal importance might otherwise have long coincident packets that exceed the available bandwidth. Absent this rule, the two streams would, from time to time, interfere with each other, thus causing truncation on both streams. The result would be that both streams truncate, then neither stream could use the available output cycles until start of packet. To avoid this waste of bandwidth, the effect of this rule is to cause a stream to defer to equal importance data until end of packet, so long as the other streams can accept higher importance data. The effect of the fairness term is that generally, streams will alternate under conditions of high load.) Otherwise, if the data from one stream is more important than data from the other(s), the more important data is selected. If the streams are of equal importance and none of the other conditions exist, then the arbitration logic selects the least recently selected stream.

According to another aspect of the invention, the clock rate of the bandwidth manager logic may be determined automatically. In some cases, data from the source is accompanied by a forwarded clock. A clock in the bandwidth manager uses the internal CPU clock to measure the period of the forward clock to determine the base frequency. If the input source has a fractional divisor, the nominal frequency is rounded to the next slower integral divisor. This enables the output rate to be determined independently of the CPU clock and the output driver frequency, by turning it into a ratio that can be determined by auto-sensing.

According to another aspect of the present invention, the bandwidth manager predicts the start of a data packet from the packet type opcode. A signal is received by the bandwidth manager from other logic in the chip that indicates that data received several ticks before was the start of a packet. To avoid the overhead which would be required to buffer the incoming ticks until the start of packet signal was received, logic is provided which predicts the start of packets, and which resynchronizes using the start of packet signal in conjunction with a data pattern of a known length, such as a series of 1-tick packets. The logic checks for the possible data pattern each clock cycle, and indicate if the data is valid and if it matches the desired data pattern. When the delayed start of packet signal arrives, if the history indicates a match of the pattern, then it is known that the current cycle is the start of packet, and can be used to predict packet length.

These and other aspects of the present invention will become apparent upon reading the detailed description of the preferred embodiment and the appended claims.

BRIEF DESCRIPTION OF THE DRAWINGS

For a detailed description of the preferred embodiments of the invention, reference will now be made to the accompanying drawings in which.

NOTATION AND NOMENCLATURE

Certain terms are used throughout the following description and claims to refer to particular system components. As one skilled in the art will appreciate, computer companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ". Also, the term "connect", "connects", "couple" or "couples" is intended to mean either an indirect or direct connection. Thus, if a first device couples to a second device, that connection may be through a direct connection, or through an indirect connection via other devices and connections. Such connections are typically electrical, but may be via optical or other signaling methods. The terms "microprocessor," "processor," and "CPU" are all used interchangeably to refer to one or more integrated circuits that contain logic elements for manipulating data and for making decisions based on executable software. The term "internal state data" is entitled to be interpreted broadly to include all control, address and data signals generated internally within an integrated circuit during normal operation, without limitation. The internal state data encompasses program counter information, internal signal states, hardware states, and any other information or state that is generated or used during the normal operation of the integrated circuit. It should be understood that although the present invention is described in the context of the preferred embodiment, which is implemented as a processor, the present invention has broader application and can be used with any digital logic device which operates at a higher speed than external test logic, and which must be tested for debug or performance purposes.

DETAILED DESCRIPTION OF THE PREFERRED EMBODIMENTS

Figure 1:
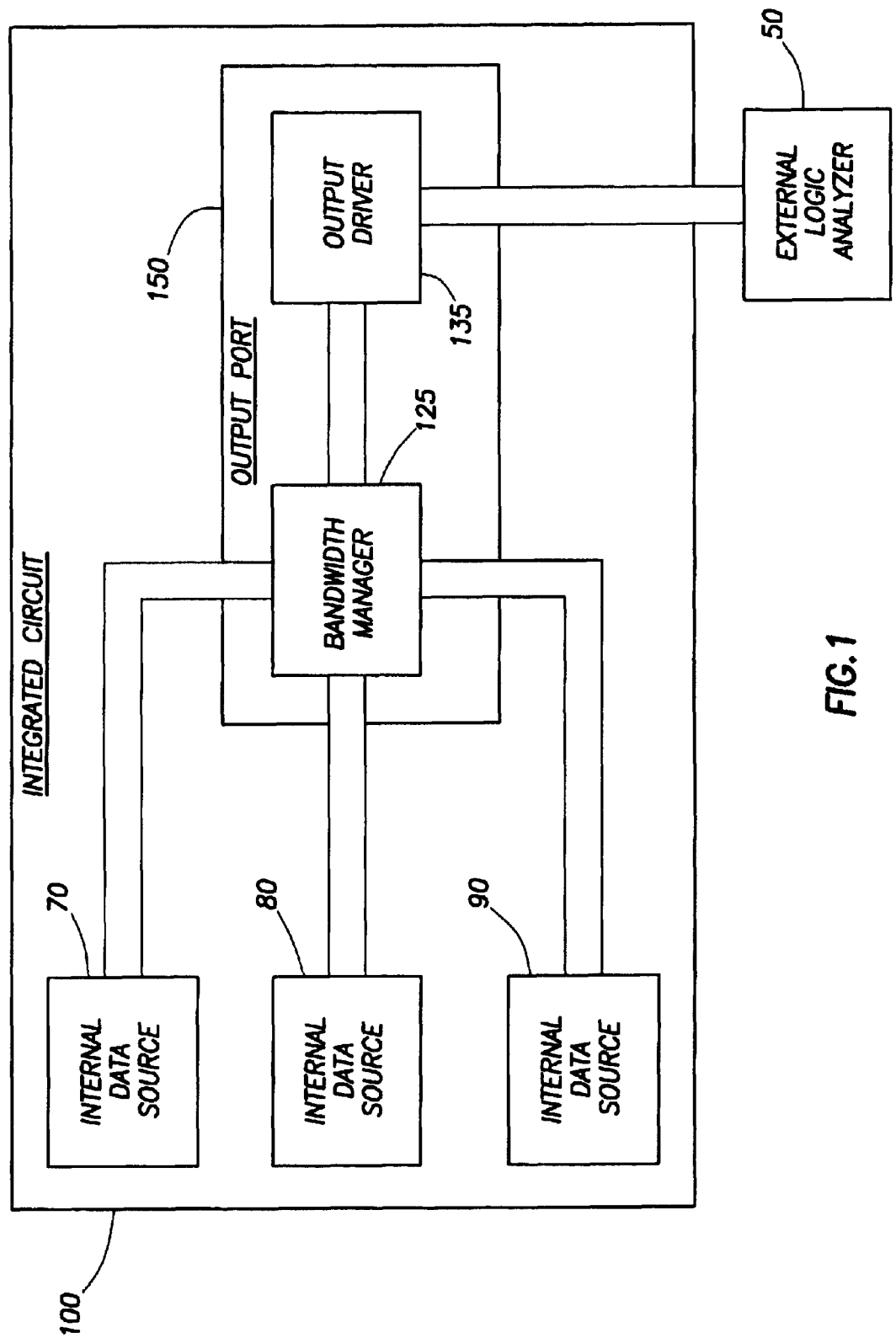
FIG. 1 shows a digital logic device constructed in accordance with the preferred embodiment with an output port that receives internal state data from various sources on the chip, and which transmits the internal state data to an external logic analyzer or capture memory.

Referring initially to FIG. 1, the present invention constructed in accordance with the preferred embodiment generally comprises an integrated circuit 100 that includes various logical components 70, 80, 90 that generate internal state data during normal operation. Three such sources are shown in FIG. 1 solely for purposes of illustration, with the understanding that any number of internal data sources or engines may exist in the integrated circuit 100. According to the preferred embodiment, at least some of these internal data sources selectively connect to an output port 150. Data from the internal data sources 70, 80, 90 is presented to a bandwidth manager 125 in the output port 150. The bandwidth manager 125 dynamically selects the presented data from the internal data sources, based on the workload of the output port 150, and on the importance of the data presented. The selected data, which preferably is received at or near the normal operating clock frequency of the integrated circuit 100 or the normal operating frequency of the source logic, is connected via the output port 150 to external test logic, such as an external logic analyzer 50, or other capture memory. The output port 150 preferably includes a number of output pads (not shown) through which the data is driven. Although one output port 150 is shown in FIG. 1, it should be understood that multiple output ports may be included in the integrated circuit 100 if desired to increase the bandwidth or for implementation convenience. In an exemplary embodiment, two such output ports are implemented to double the available bandwidth. If multiple output ports are provided, each with their own dedicated pads, then each output port may be configured to operate independently and to select different data sources based on programmed values.

In accordance with the preferred embodiment, the bandwidth manager 125 attempts to pass as much of the internal state data as it can to the output driver 135, given the mismatch between the internal data rates, and the output port data rate. If the output port 150 is saturated, and not all internal state data can be driven out from a particular source or sources, then the bandwidth manager 125 selects the most important data to drive out to the external logic. As will be discussed in more detail with reference to FIG. 2, the bandwidth manager 125 preferably includes relatively simple hardware that prioritizes the internal state data and outputs as much information, including the low priority information, as possible given the available output bandwidth.

A standard packet of data comprises a number of "ticks" of various types of information. As an example, assume a particular type of memory transaction requires 6 cycles to complete, with 8 data/control lines. Further, assume that the 8 data/control lines are only valid every other cycle. Thus, in each valid cycle, 8 bits of data are transmitted. These 8 bits of data in a particular valid cycle comprise a "tick". Although 6 clock cycles are required to complete the transaction, only 3 are valid, so the packet would have a length of 3 ticks. On the other hand, if the data/control lines were valid every cycle, the packet would have a length of 6 ticks.

Packets are almost universally configured with the control information and routing information at the beginning of the packet (in the first or first few ticks of the packet). From a debug perspective, the control and routing information is typically the most important information to recover. The reason that this information is put at the beginning of a packet is that other devices receiving the packet must make a decision very quickly, and the earlier the control and routing information is received, the earlier the receiving device can begin responding. The data being transferred usually follows the control and routing information, which may be referred to as the "payload" of the packet. The payload is often of lesser interest to a debugger. Because most protocols require that the control and routing information be placed at the front of a packet, the most important debugging information is at the front of the packet, and the least important debugging information is at the rear of the packet. A complicating factor is that data packets may be encapsulating another data packet, complete with control and routing information. In this instance where a packet is encapsulated within another packet, it is still the case that the earlier ticks are more important (more likely to be useful to a debugger) than later ticks. That is, the insight that the start of a packet is more interesting than what follows applies recursively to encapsulated packets. This is key to understanding the operation of the smart buffers that will be described below.

The bandwidth manager 125 treats the output driver 135 as a relatively slow device (compared to the peak and sustained bandwidth presented for output), that periodically can output a tick of data. When the output driver 135 transmits a tick of data, it gives the bandwidth manager 125 the opportunity to load another packet tick. The bandwidth manager 125 attempts to send out as much information as it can through the relatively slow output driver 135, and keeps track of which tick in a packet is being presented to it. If the bandwidth manager 125 can accept each presented data tick, then the output driver 135 is keeping up with the internal state data and is emptying the ticks from the bandwidth manager as quickly as the new state data is arriving. If the output drivers cannot keep up with the data being presented to the bandwidth manager 125, the bandwidth manager examines each newly presented tick and determines the relative importance of that tick as compared to the relative importance of the preceding stored tick. The more important tick is then saved in the last storage location of the bandwidth manager. This comparison may also occur in each of the other locations of the bandwidth manager, so that important ticks advance through the bandwidth manager, with a tail-eating type of action. Thus, the less important data at the back of a packet is dropped by the bandwidth manager 125, thereby permitting the more important information from the front of the next packet to be saved and driven out by the output driver 135. Consequently, in cases of congestion at the output port, due to either a high arrival rate or a low output rate, or both, less important data is automatically chewed up by more important data, to the extent required, and that data then is driven off-chip at the output rate of the output driver 135. For periods where the arrival rate is low, or the output rate is high, or both, very little or no tail-eating occurs, and the entire packet is preserved and sent off-chip. As a result of this operation, the output port has no wasted cycles where no data is driven off the chip, unless there is no data to output. As long as data is arriving at the output port 150 from the internal data sources, data will be output through the driver 135, and the data that is output will include the most important part of the packet. Thus, the bandwidth manager 125 operates dynamically to optimize the use of available bandwidth and therefore delivers the most possible debugging information possible, given the physical constraints of the output port and the external logic analyzer, while prioritizing the information so that under conditions of heavy load at the output port compared to available bandwidth, the most important state data gets transmitted.

The output driver 135 preferably comprises a number of latches that latch in the selected data from the bandwidth manager 125 based on a clock signal that determines the output data rate, and drivers (in the exemplary implementation, open drain drivers) that drive the selected data off-chip at a frequency determined by the clock signal. The output drivers are bandwidth limited due primarily to external constraints.

Simulation tests of the bandwidth manager have been conducted on data that is being generated at about 13 Gbytes/sec, and delivering that data to a managed output port capable of 3.2 GB/sec. These tests show that 100% of the time the output port is able to deliver the most important data to external test logic. Approximately 70–80% of the time, the entire packet is delivered off-chip. The three most important ticks of packets were delivered off-chip over 90% of the time. These results have subsequently been confirmed in hardware.

Figure 2:
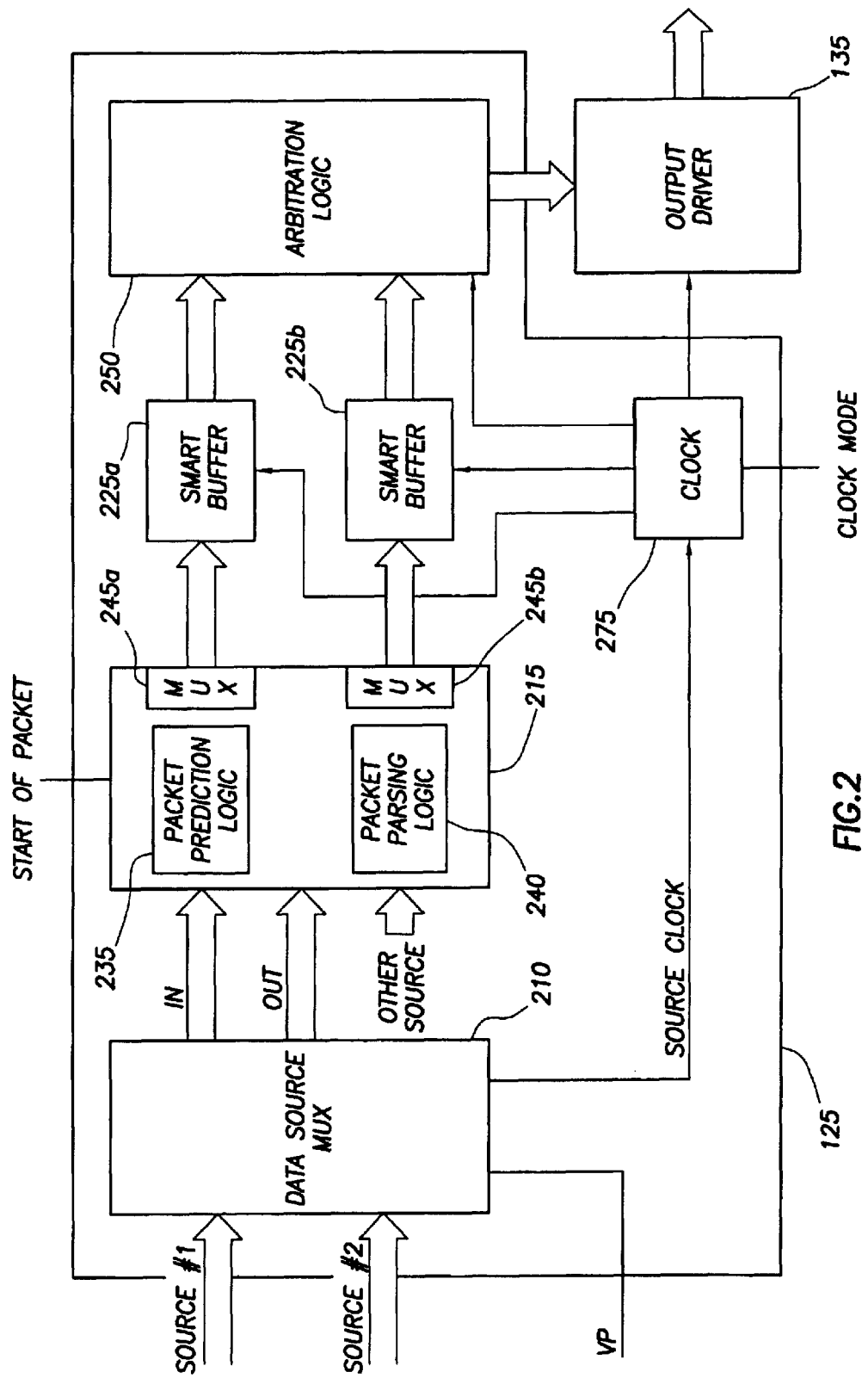
FIG. 2 shows the bandwidth manager of FIG. 1 in more detail.

Referring now to FIG. 2, the preferred implementation of the bandwidth manager 125 is shown in more detail, with the understanding that other configurations of the bandwidth manager 125 are possible to implement the concepts described herein. As shown in FIG. 2, the bandwidth manager 125 preferably includes a front-end multiplexer 215 that selects the data source, one or more smart buffers 225 (two are shown in the example of FIG. 2, and are labeled as 225a and 225b), and an arbitration logic 250 that selects which of the data paths or streams to pass to the output driver 135 for transmission off the chip. In addition, to transmitting internal state data off-chip, the output driver 135 may also transmit a clock signal that determines the output port bandwidth.

In the preferred embodiment of FIG. 2, the front end of the bandwidth manager 125 comprises a data source multiplexer 210, which receives internal source data from two or more sources within the integrated circuit. According to the preferred embodiment, the incoming data sources represent state data that is generated in particular regions of the integrated circuit, and thus the data source multiplexer 210 operates to select data from regions within the integrated circuit. The selection of the incoming data is determined by a select signal (VP) which may be user programmable. The user programmed value conventionally resides in a configuration and status register (not shown), and may be used to determine the source, as well as the direction of the data (i.e., whether the data is input data, output data, or multiplexed data).

In an exemplary embodiment, the output port is constructed with two bandwidth managers and two output drivers to double the bandwidth of the output port. In this example, the region within the integrated circuit is divided into quadrants, and internal data from each quadrant is provided to one of two data source multiplexers 210. Although the internal state data is divided into regions within the integrated circuit, it should be understood that a different organization may be employed, or the regions may be grouped into any number of categories, without departing from the principles of the present invention. Moreover, if data is fed directly into the bandwidth manager from all sources, the data source multiplexer 210 and the front-end multiplexer 215 may be combined into a single multiplexer for selecting the source of incoming data.

According to the exemplary embodiment of FIG. 2, the data source multiplexer 210 has multiple output channels to the front-end multiplexer 215. The output channels are named IN channel and OUT channel in the figure. Both IN and OUT are capable of operating at the same speed. It should be noted that IN and OUT are arbitrary names for two data sources; they have no functional significance to the operation of the Bandwidth Manager. In the exemplary implementation, IN and OUT refer to the direction of the data when it was sampled at the source; both the IN channel and the OUT channel flow in the same direction in the Bandwidth Manager Thus, the data source selected by the data source multiplexer 210 may include both in-channel and out-channel data from the same region (or compass point) at the same time. As an example, the IN channel and OUT channel may refer to a processor that includes one or more ports for linking bi-directionally to other processors. In this example, data coming into the processor port in one geographic region would be placed on the IN channel, while data going out of the processor port in that same geographic region would be placed on the OUT channel. In addition, data from other sources may be presented to the front-end multiplexer 215, as shown in FIG. 2. These other sources may include program counter data or data from other logical units within the integrated circuit. The front-end multiplexer 215 includes one or more set of multiplexes 245 that select the data to present to the smart buffers 225. Preferably, a multiplexer 245 is provided for each stream or pipe in the bandwidth manager 125. Thus, in the example of FIG. 2 where two streams are shown, two multiplexers 245a and 245b are shown. The multiplexers 245a and 245b each select either the IN channel, the OUT channel, a combination of the two, or one of the other data sources presented to the front-end multiplexer 215.

The front-end multiplexer 215 also may include packet prediction logic 235, or else receives a signal from other circuitry within the integrated circuit regarding the packet tick being examined. Alternatively, the packet prediction logic may be located in the data source multiplexer 210. Or, the start of packet signal may be provided by other logic related to the data source. The packet logic preferably is capable of detecting or at least predicting the start of a packet, and the number of ticks that exist in the packet. The packet prediction logic 235 preferably includes logic for framing a packet and determining the start of a packet. The packet prediction logic also preferably includes a decoder that examines the appropriate tick(s) of the packet for data, such as the opcode that identifies the packet length.

According to the preferred embodiment, the front-end multiplexer also preferably includes packet parsing logic 240 that assigns an importance value to the incoming source data, which is added as 1 or more control bits to the tick. Thus, as an example, a single bit may be used to designate the first tick (or first n) ticks in a packet. Alternatively, the packet parsing logic 240 may employ multiple bits to provide more importance levels. Thus, as an example, the packet parsing logic 240 may use two bits to encode four different importance levels, which may comprise "most important," "of secondary importance", "of lesser importance," and "not important". These encoded values may also be assigned based on the location of the tick in the packet, so that the first (or first n) tick is designated as the "most important." The second tick in the packet (or second set of ticks) is designated as of "secondary importance." The third tick in the packet (or third set of ticks) is designated as of "lesser importance," and the remaining ticks are designated as "not important." This principle can be easily extended by one skilled in the art. The packet prediction logic 235, therefore, determines the start of a packet and the number of bits in the packet, and the packet parsing logic 240 uses that information to encode the importance of a tick based on its location in the packet. This information is included as one or more control bits that thereafter accompanies the tick through the bandwidth manager 125. In addition, the front-end buffer 215 also preferably adds a second control bit to the tick to indicate if the tick is present or absent in each cycle. Cycles in which a tick is "present", or "valid" for a given smart buffer (channel) contain data that is to be considered for output. Other cycles do not present load to the smart buffer (and so output port), and may be considered idle. A buffer that has been loaded with a valid tick is considered "full", and remains full until the buffer is unloaded.

The front-end multiplexer 215 presents source data (with the control bits indicating importance and validity of the tick) every cycle to the smart buffer 225. The smart buffer 225 preferably resembles a FIFO (first-in, first-out) memory buffer, with a plurality of memory locations that shift data to the next adjacent downstream memory location and receive data from the next upstream storage location. In the following discussion, a single smart buffer 225 will be described, with the understanding that multiple buffers may be provided, as shown in the exemplary embodiment of FIG. 2. According to the exemplary embodiment, the smart buffer 225, as the name implies, features a certain degree of intelligence or awareness regarding the data that is presented to it for storage by the front-end multiplexer 215, and regarding the content of the data stored in its storage locations. In particular, the smart buffer knows the status of each storage element in the memory buffer, including whether the storage element is empty or full, and whether the data tick stored in each memory location is important or not important (or knows the relative importance level of each tick stored in each of the various storage locations). The buffer also receives a clock signal from the clock circuit 275 indicating when a data tick is captured by the output driver 135 for transmission, thus indicating that the data in each memory cell can be moved one space downstream.

As noted, data from the front-end multiplexer 215 is offered to the smart buffer(s) every cycle. If the end slot (the one furthest upstream) in the buffer 225 is empty, then the data is accepted. Similarly, if the smart buffer is appraised by the clock signal from the clock circuit 275 that the output driver 135 is unloading a data tick, then the buffer 225 causes each storage location to shift its data one location downstream, and the buffer 225 can accept any data offered by the front-end multiplexer 215.

If data is present in the end slot of the buffer 225, and no data is currently being transmitted by the output driver 135, then the smart buffer 225 must make a decision as to whether to accept or reject the data being presented by the front-end multiplexer 215. In that instance, the smart buffer 225 examines the importance control bit(s) to determine the relative importance of the data being presented by the front-end multiplexer 215. If the tick being presented by the front-end multiplexer 215 is more important than the tick stored in the end slot of the smart buffer, then the new data overwrites the tick previously stored in the end slot of the smart buffer. If the newly presented data is less important than the data stored in the end slot of the smart buffer, the newly presented data is dropped.

The clock circuit 275 receives a forwarded clock signal (Clock Source) that reflects the clock signal at source of the data. The clock circuit generates a clock signal to the smart buffer 225 that indicates when data can be shifted in the memory buffers. Similarly, another clock signal is transmitted to the arbitration logic 250 and to the output driver 135 reflecting the output data rate, and thereby indicating that data is being transmitted off-chip. The output clock frequency may or may not be related to the source clock frequency. Data is offered to the smart buffer by the front-end multiplexer 215 based on the source clock, which is typically similar to the internal clock of the integrated circuit.

As data fills the smart buffer 225, it is permitted to progress, filling any empty slots in the smart buffer, or any slots that are of lesser importance. This operation can occur on every cycle of the source clock, so each time data is presented to the smart buffer, and if no data is being unloaded from the smart buffer, each tick is permitted to move one slot downstream if it is of greater importance, or if the downstream slot is empty. Thus, the difference between the source (or system) clock and the output data rate may cause data stored in the memory buffer to "eat" (overwrite) other less important data. The smart buffer 225 receives a signal from the packet prediction logic indicating if a tick is the first tick in a packet. To insure that no holes develop in a packet's data, the buffer 225 keeps track of whether a tick was presented to the smart buffer, but was not accepted. In that event, the buffer will not accept any other ticks from that packet until the signal is received indicating a new packet is starting. Alternatively, this logic may be implemented in the front-end multiplexer 215. Regardless of where implemented, this logic insures that no holes develop in the middle of a packet of data. Avoiding holes ensures that the external logic can uniquely determine the structure of the original data from the output of the bandwidth manager.

The smart buffer 225 also preferably includes logic to pack the buffer in the event that one or more empty memory slots exist in the middle of the buffer. For example, a situation could arise in which the downstream (or front) end of the buffer is full, there is a hole in the middle where the memory slots are empty, and important ticks have been loaded in the upstream (or back) slots. In that situation, the smart buffer logic preferably will cause the important data at the upstream end of the buffer to advance into the slots that are empty on each cycle of the internal (high-speed) clock. In addition, because the upstream data is advancing through the smart buffer, the buffer knows that the upstream end slot of the buffer will be free to accept newly presented data from the front-end multiplexer 215. Thus, the smart buffer is capable of accepting and advancing data at system clock rates, while only unloading data at the slower output data rate. This ability to load and advance data at the higher clock rate permits the buffer to fill gaps and pack the buffer.

The smart buffer 225 thus makes a decision as to whether to accept or drop a tick that is presented by the front-end multiplexer 215 at frequencies as high as the internal clock frequency. The speed and frequency with which data is actually presented to the smart buffer may be irregular. Sometimes the data will be offered every cycle. In other instances the data may come in bursts. Sometimes no data will be offered for extended periods.

The arbitration logic 250 receives the data being unloaded from the smart buffer 225, and passes that data to the output driver 135 for driving off-chip. In implementations where multiple streams are used (i.e., where there are multiple smart buffers configured in parallel), and have data to be transmitted off-chip, the arbitration logic must select which of the ticks from the offering smart buffers it will select to pass to the output driver 135. Thus, referring to the exemplary embodiment of FIG. 2 where two streams are shown for purposes of illustration, arbitration logic 250 selects a tick from one of the smart buffers 225a, 225b, which will then be passed to the output driver 135. The arbitration logic 135 may include a memory buffer to store one or more ticks of data that have been selected, or may pass the tick directly to the output driver 135. The arbitration may be configured with various arbitration protocols to insure that the smart buffers 225a, 225b are permitted to unload their data in timely fashion so as not to lose important data that is being presented at the upstream end.

According to the preferred implementation for the arbitration logic, the arbitration logic 250 is configured to accept data from a particular buffer if that is the only channel of interest to the user. Preferably, each stream is treated as being of equal importance, and the arbitration rules apply equally to both streams. If both channels have been selected for off-loading by the user, then the arbitration logic 250 must examine the control bits that indicate if the buffer slot is full and the relative importance of the tick in that memory slot. Thus, the arbitration logic 250 determines which buffer 225a, 225b to accept data from based on the status of the important and full bits associated with the data in the downstream slot of each buffer. In addition, the arbitration logic 250 may also receive a signal indicating if a buffer is not under pressure because one or more empty slots exist in the buffer. This can be implemented in a variety of ways, including, for example, determining if a particular slot (such as the back slot) is empty, or if any other slots in the buffer are empty (by ORing together the empty bits from the smart buffer), or by receiving the empty signal bit from all or a subset of all of the memory slots. Regardless of the specific implementation, the arbitration logic 250 preferably is capable of detecting if any slots in a buffer are empty so that it can determine if the buffer is under pressure.

According to the exemplary embodiment, the arbitration logic 250 will select data from a smart buffer if that buffer is under pressure but the other buffer is not. Thus, regardless of the data in the downstream slot of the buffers, the arbitration logic will select data from the buffer, which is under pressure. If both buffers are under pressure or if neither buffer is under pressure, then the arbitration logic will select the buffer, which has the more important data. If both buffers are of equal pressure and the data in the downstream slot if of equal importance, then the arbitration logic 250 implements a round-robin approach where it will alternatively select the downstream slot from each buffer.

Referring still to FIG. 2, the clock circuit 275 preferably receives a clock mode signal, which may be user programmable. The clock mode signal preferably designates the clock speed at which data is to be output from the output port 150. According to the preferred embodiment, in response to the status of the clock mode signal, the clock circuit 275 either selects a predetermined output rate, or else selects a clock rate that is determined based on the selected data source. If the clock circuit 275 uses the clock of the data source, the clock circuit 275 preferably divides the forwarded clock by an appropriate divisor based on the selected source data and number of enabled smart buffers to obtain a suitable output clock.

The possibility exists that different sources within the integrated circuit may operate at different frequencies. In a processor, for example, certain sources may have a static rate, such as the CPU clock frequency. For these sources, selection of a divisor is straightforward. In some instances, however, sources may be dynamic, and may operate at a frequency different than the system clock. The problem arises that if a rate is selected based on the static sources, it may not be suitable for the dynamic sources. In the preferred embodiment of the present invention, and according to another aspect of this invention, the clock circuit 275 receives a forwarded clock (Source Clock) that reflects the clock signal of the selected source. The clock circuit 275 uses the internal system clock (such as the CPU clock signal in a processor) to measure the period of the forwarded clock signal in a fashion similar to a frequency counter. This measurement establishes the divisor that is used by the dynamic source to generate its clock signal, and also establishes the base frequency necessary to process the data through the front-end multiplexer and the smart buffer. According to the preferred embodiment, if the ratio between the internal clock signal and the forwarded clock signal is fractional then further adjustments must be made to match the output rate. Preferably, this is accomplished by having the clock circuit 275 by rounding the divisor up, to thereby obtain a clock frequency that is an integral ratio of the internal system clock. Rounding up may be counter-intuitive; however, it tends to produce an output clock that will not exceed the maximum output rate of the output driver. Rounding down is more likely to select a clock frequency that exceeds the maximum output rate of the output driver. In the exemplary embodiment, "tends" and "more likely" were guaranteed by analysis of the data sources involved. In other embodiments, using methods known to anyone skilled in the art, care should be taken to analyze the data source frequencies and verify that this is true of the data sources involved. In rare cases, a more complex algorithm, or direct programming of the output frequency may be indicated.

If enabled by the Clock Mode signal, the clock circuit 275 will automatically sense the proper rate for the output rate by rounding up the divisor of the data source and using it as the output clock. The clock circuit continuously performs this operation, so that if the data source changes, the clock circuit 275 will automatically determine the appropriate output rate to match the source's clock signal. If the Clock Mode is not asserted, then the clock circuit 275 uses a predetermined rate at the output data rate.

Figure 3:
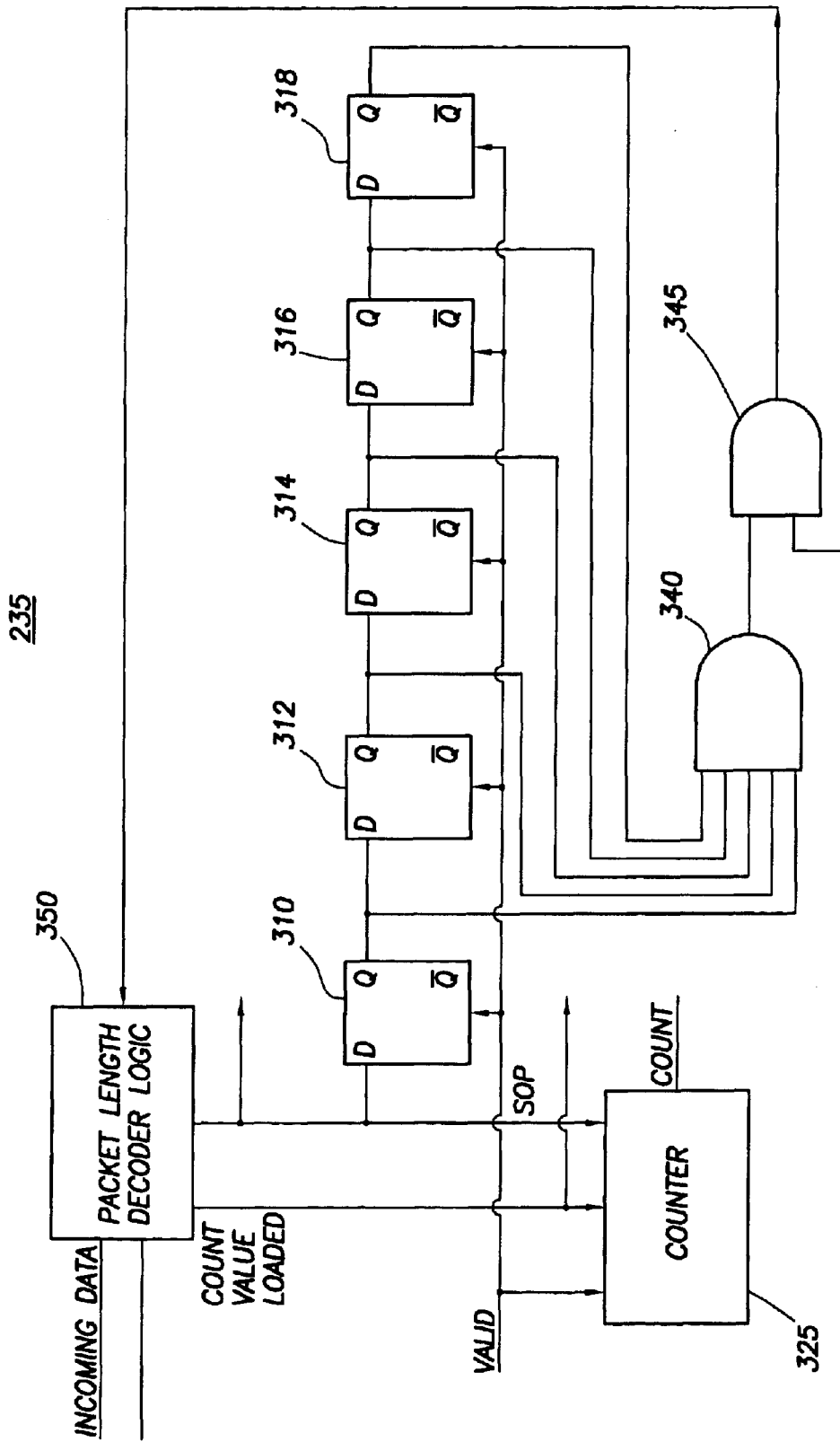
FIG. 3 shows the packet prediction logic of FIG. 2 in more detail.

Referring now to FIGS. 2 and 3, the packet prediction logic 235 will be discussed in more detail in accordance with the preferred embodiment. According to the preferred embodiment, the packet prediction logic 235 receives a Start of packet signal from other logic within the integrated circuit. This signal, however, may not be received until several clock cycles after the front-end multiplexer 215 receives the data. Thus, as an example, the Start of packet may not be received until 5 clock cycles after the first tick of a packet was received by the packet prediction logic 235. According to the preferred embodiment, the packet parsing logic 240 needs this information to assign an importance level to the tick, and the front end multiplexer 215 needs it to determine when to stop discarding packet data due to truncation. Because this information does not arrive until several cycles after the tick, the multiplexer 215 (or multiplexer 210, if that is where the importance value is assigned) must hold the ticks for that number of cycles. Doing so, however, would require that an array of latches, which would be as deep as the start of packet latency, be constructed for each of the data bits in the tick, which adds to the cost and space required to implement the output port.

To avoid the overhead that would be required to store the ticks until it was determined if that tick constitutes a start of a packet, the packet prediction logic 235 preferably is capable of predicting the start of a packet by synchronizing the packet prediction logic when it sees a particular pattern of packet types. Referring now to FIG. 3, the packet prediction logic 235 preferably includes a packet length decoder 350, a counter 325, and x flip-flops, where x represents the number of clock cycles that the Start of packet signal is delayed relative to receipt of the tick. FIG. 3 illustrates the example where the receipt of the Start of packet signal is delayed for 5 clock cycles, and thus 5 flip-flops, 310, 312, 314, 316, 318, are shown. The packet length decoder 350 preferably examines the appropriate tick of a packet (which typically is the first tick) to determine what type of packet is arriving from the source. Based on the packet type, or based on other bits provided in the packet header, the decoder 350 preferably determines the length of that packet and also predicts whether a tick is the start of a packet. The count value is loaded in counter 325, which then counts down to zero. The decoder 350 also preferably outputs a SOP signal, which is the predicted start of a packet that is used by the bandwidth manager logic to assign an importance level. The SOP signal also is provided to the counter to reset the count value. The counter 325 preferably outputs a count signal indicating what position the current tick is in the packet. Thus, the decoder 350 and counter 325 enable the bandwidth manager to determine the start of the packet, the length of the packet, and where each tick resides in a packet, so that importance levels can be assigned to the ticks.

If an error condition exists in the packet type or packet length codes in a packet, the operation of the packet prediction logic 235 and the packet parsing logic 240 may be compromised. According to the preferred embodiment, the flip-flops and the associated AND gates 340, 345 are implemented to synchronize the packet prediction logic back with the start of packets, using the delayed Start of packet signal from the other logic in the integrated circuit. A pattern of 1-tick packets preferably are used to perform this synchronization. The first flip-flop 310 (a single bit wide) preferably receives the predicted start of packet signal (SOP), and passes this signal to each of the successive flip-flops on successive clock cycles. If x successive start of packets are detected by the decoder 350 and counter 325 operating in conjunction, then all of the x flip-flops will be holding a "1" value. This causes AND gate 340, which is connected to the output terminal of each of the x flip-flops, to be driven high. AND gate 345 receives the output of AND gate 340, and will driven high if AND gate 340 is driven high and if the delayed Start of packet signal is received. Thus, AND gate 345 only is asserted if x 1-tick packets have been detected in succession, and if the Start of packet signal is received. The output of AND gate is applied to the decoder 350 to inform the decoder that the last tick was a 1-tick packet, and thus the next tick is the start of another packet. Thus, in the example given, the packet prediction logic replaces an array of 5 times the data source width latches with 5 single-bit flip-flops and a small counter.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. An integrated circuit fabricated on a chip, comprising:

at least one source device in the integrated circuit generating internal state data at a first frequency;

an output port that drives data to external logic at a second frequency that is lower than said first frequency; and wherein said output port includes a bandwidth manager that selects internal state data that it is most important to drive to said external logic during periods when said output port becomes saturated, and which selects all internal state data to drive to said external logic during periods when said output port is not saturated.

2. The circuit of claim 1, wherein the integrated circuit comprises a processor, and multiple internal data sources generate internal state data.

3. The circuit of claim 2, wherein the internal state data sources are organized by regions within the processor, and internal state data from one or more of the regions are selected by a user programmable enable signal.

4. The circuit of claim 3, further comprising a data source multiplexer that selects said one or more regions based on said user programmable enable signal.

5. The circuit of claim 2, wherein multiple output ports are provided in said processor, at least one of which includes a bandwidth manager.

6. The circuit of claim 2, wherein output port includes an output driver that drives internal state data selected by the bandwidth manager to said external logic.

7. The circuit of claim 6, wherein the bandwidth manager includes selection logic that selects data from one or more sources to pass to said output driver.

8. The circuit of claim 7, wherein the selection logic comprises a multiplexer.

9. The circuit of claim 7, wherein the selection logic assigns an importance level to each tick of said internal state data, which is used by said bandwidth manager to determine whether the tick should be selected for transmission to external logic when the output port is saturated.

10. The circuit of claim 9, wherein the selection logic adds at least one control bit to each tick indicating the importance level of that tick.

11. The circuit of claim 9, wherein the selection logic also adds a control bit to each tick indicating if the tick represents valid data.

12. The circuit of claim 11, wherein the bandwidth manager further includes a smart buffer coupled to said selection logic, and wherein said selection logic presents a tick to said smart buffer at said first frequency.

13. The circuit of claim 12, wherein the smart buffer has a plurality of slots for storing ticks, and wherein said smart buffer periodically unloads a tick at the second clock frequency to pass to said output driver.

14. The circuit of claim 13, wherein the smart buffer is configured as a first-in, first-out memory buffer, and wherein said smart buffer accepts the tick presented by said selection logic if a first slot in said smart buffer is empty.

15. The circuit of claim 14, wherein the smart buffer accepts the tick presented by said selection logic if the smart buffer is concurrently unloading a tick to pass to said output driver.

16. The circuit of claim 14, wherein the smart buffer accepts the tick presented by said selection logic if the importance level of the presented tick is greater than the importance level of the tick stored in the first slot of said memory buffer, and wherein said smart buffer overwrites the value of the presented tick in said first slot.

17. The circuit of claim 14, wherein the smart buffer determines if any slots are empty, and if so, advances ticks stored in full slots to fill the empty slots.

18. The circuit of claim 17, wherein the full ticks are advanced on at a rate equal to said first frequency.

19. The circuit of claim 14, wherein a plurality of smart buffers are included in said bandwidth manager which are connected in parallel to process data concurrently.

20. The circuit of claim 19, wherein the selection logic is capable of presenting a tick to each of said plurality of said smart buffers at a rate equal to said first frequency.

21. The circuit of claim 20, wherein the bandwidth manager further includes arbitration logic coupled to a last slot of each of said plurality of smart buffers, and wherein said arbitration logic selects the tick stored in the last slot of one of said smart buffers to unload at said second clock frequency.

22. The circuit of claim 20, wherein the arbitration logic receives a signal indicating the importance of the tick in the last slot of each smart buffer, whether the last slot of each smart buffer is full, and whether each smart buffer is under pressure.

23. The circuit of claim 22, wherein the arbitration logic selects the last tick from a smart buffer if it is under pressure and the other smart buffer(s) is not.

24. The circuit of claim 22, wherein the arbitration logic selects the last tick which has the highest importance level.

25. The circuit of claim 21, wherein the arbitration logic selects the last tick from said plurality of said smart buffers on a round-robin basis.

26. The circuit of claim 1, wherein the first frequency is the frequency of the selected source.

27. The circuit of claim 26, further comprising a clock circuit that automatically determines the second frequency based on the ratio of the first frequency to an internal system clock.

28. The circuit of claim 27, wherein the clock circuit rounds up the ratio to an integer value to reduce the second frequency.

29. The circuit of claim 1, wherein the bandwidth manager includes packet prediction logic which predicts the start of a packet of internal state data, and which assigns an importance value to each tick of said packet based on the location of the tick in the packet.

30. The circuit of claim 29, wherein the packet prediction logic includes a decoder that decodes opcodes in a first tick of a packet to identify the length of each packet.

31. The circuit of claim 29, wherein the packet prediction logic synchronizes when a packet pattern is detected from said source device.

32. A processor, comprising:
 a plurality of internal source devices generating internal state data at a first frequency;
 an output driver that drives data to external logic at a second frequency; and
 a bandwidth manager that selects internal state data that is most important to drive to said external logic during periods when said output port becomes saturated, and which selects all internal state data to drive to said external logic during periods when said output driver is not saturated.

33. The processor of claim 32, wherein the internal state data sources are organized by regions within the processor, and internal state data from one or more of the regions are selected by a user programmable enable signal.

34. The processor of claim 32, wherein multiple sets of output drivers and bandwidth managers are provided in said processor.

35. The processor of claim 32, wherein the bandwidth manager includes selection logic that selects data from one or more sources to pass to said output driver.

36. The processor of claim 35, wherein the selection logic assigns an importance level to each tick of said internal state data, which is used by said bandwidth manager to determine whether the tick should be selected for transmission to external logic when the output driver is saturated.

37. The processor of claim 36, wherein the selection logic adds at least one control bit to each tick indicating the importance level of that tick.

38. The processor of claim 37, wherein the selection logic also adds a control bit to each tick indicating if the tick represents valid data.

39. The processor of claim 38, wherein the bandwidth manager further includes a smart buffer coupled to said selection logic, and wherein said selection logic presents a tick to said smart buffer at said first frequency.

40. The processor of claim 39, wherein the smart buffer has a plurality of slots for storing ticks, and wherein said smart buffer periodically unloads a tick at the second clock frequency to pass to said output driver.

41. The processor of claim 40, wherein the smart buffer is configured as a first-in, first-out memory buffer, and wherein said smart buffer accepts the tick presented by said selection logic if a first slot in said smart buffer is empty.

42. The processor of claim 41, wherein the smart buffer accepts the tick presented by said selection logic if the smart buffer is concurrently unloading a tick to pass to said output driver.

43. The processor of claim 41, wherein the smart buffer accepts the tick presented by said selection logic if the importance level of the presented tick is greater than the importance level of the tick stored in the first slot of said memory buffer, and wherein said smart buffer overwrites the value of the presented tick in said first slot.

44. The processor of claim 43, wherein the selection logic includes packet prediction logic which predicts the start of a packet of internal state data, and which assigns said importance value to each tick of said packet based on the location of the tick in the packet.

45. The processor of claim 44, wherein the packet prediction logic includes a decoder that decodes opcodes in a first tick of a packet to identify the length of each packet.

46. The processor of claim 45, wherein the packet prediction logic synchronizes when a packet pattern is detected from said source device.

47. The processor of claim 41, wherein the smart buffer determines if any slots are empty, and if so, advances ticks stored in full slots to fill the empty slots.

48. The processor of claim 47, wherein the full ticks are advanced on at a rate equal to said first frequency.

49. The processor of claim 41, wherein a plurality of smart buffers are included in said bandwidth manager which are connected in parallel to process data concurrently.

50. The processor of claim 49, wherein the selection logic is capable of presenting a tick to each of said plurality of said smart buffers at a rate equal to said first frequency.

51. The processor of claim 50, wherein the bandwidth manager further includes arbitration logic coupled to a last slot of each of said plurality of smart buffers, and wherein said arbitration logic selects the tick stored in the last slot of one of said smart buffers to unload at said second clock frequency.

52. The processor of claim 51, wherein the arbitration logic receives a signal indicating the importance of the tick in the last slot of each smart buffer, whether the last slot of each smart buffer is full, and whether each smart buffer is under pressure.

53. The processor of claim 52, wherein the arbitration logic selects the last tick from a smart buffer if it is under pressure and the other of said plurality of smart buffers are not.

54. The processor of claim 52, wherein the arbitration logic selects the last tick which has the highest importance level.

55. The processor of claim 52, wherein the arbitration logic selects the last tick from said plurality of said smart buffers on a round-robin basis.

56. The processor of claim 32, wherein the first frequency is the frequency of the selected source.

57. The processor of claim 56, further comprising a clock circuit that automatically determines the second frequency based on the ratio of the first frequency to an internal processor clock.

58. The processor of claim 57, wherein the clock circuit rounds up the ratio to an integer value to reduce the second frequency.

59. The processor of claim 32, wherein the second frequency is substantially less than said first frequency.

60. The processor of claim 32, wherein the second frequency is substantially the same as the first frequency.

61. An integrated circuit fabricated on a chip, comprising:
at least two source devices in the integrated circuit, each of which is capable of generating internal state data at a first frequency;
an output port that drives data to external logic at said first frequency; and
wherein said output port includes a bandwidth manager that selects internal state data that is most important to drive to said external logic during periods when said output port becomes saturated, and which selects all internal state data to drive to said external logic during periods when said output port is not saturated.

62. An integrated circuit fabricated on a chip, comprising:
at least one source device in the integrated circuit generating internal state data at a first frequency;
an output port that drives data to external logic at a second frequency; and
wherein said output port includes at least one smart buffer that examines each newly presented tick of internal state data and determines the relative importance of that tick as compared to the relative importance of the last previously stored tick.

63. The integrated circuit of claim 62, wherein the second frequency is substantially less than said first frequency.

64. The integrated circuit of claim 62, wherein the second frequency is substantially the same as the first frequency.

65. The system of claim 62, wherein the smart buffer permits more important ticks to advance through the smart buffer with a tail-eating type of action in instances where the output port becomes saturated.

66. The system of claim 62, wherein the smart buffer permits all valid ticks to advance through the smart buffer in instances where the output port is not saturated.

* * * * *